(12) United States Patent
Bialer et al.

(10) Patent No.: US 11,378,674 B2
(45) Date of Patent: Jul. 5, 2022

(54) OBJECT POSITION AND MOVEMENT ESTIMATION USING RADAR

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 16/510,323

(22) Filed: Jul. 12, 2019

(65) Prior Publication Data
US 2021/0011146 A1 Jan. 14, 2021

(51) Int. Cl.
*G01S 13/58* (2006.01)
*G01S 7/35* (2006.01)
*G01S 13/34* (2006.01)
*G01S 13/931* (2020.01)

(52) U.S. Cl.
CPC ............ *G01S 13/584* (2013.01); *G01S 7/352* (2013.01); *G01S 13/343* (2013.01); *G01S 7/356* (2021.05); *G01S 13/931* (2013.01)

(58) Field of Classification Search
CPC ...... G01S 7/295; G01S 13/582; G01S 13/931; G01S 7/2883; G01S 7/2923; G01S 7/023; G01S 7/35; G01S 7/354; G01S 7/36; G01S 7/40; G01S 13/12; G01S 13/34; G01S 13/343; G01S 13/534; G01S 13/93; G01S 7/356
See application file for complete search history.

(56) References Cited

U.S. PATENT DOCUMENTS

| | | | | |
|---|---|---|---|---|
| 2016/0377711 | A1* | 12/2016 | Arage | G01S 13/103 342/70 |
| 2019/0242972 | A1* | 2/2019 | Mezler | G01S 7/2923 342/112 |
| 2019/0377062 | A1* | 12/2019 | Barkan | G01S 13/536 |
| 2020/0116850 | A1* | 4/2020 | Santra | G01S 13/449 342/149 |
| 2020/0191936 | A1* | 6/2020 | Witter | G01S 13/343 |
| 2020/0218913 | A1* | 7/2020 | Unnikrishnan | G06K 9/6218 |

* cited by examiner

*Primary Examiner* — Thomas M Hammond, III
(74) *Attorney, Agent, or Firm* — Cantor Colburn LLP

(57) ABSTRACT

A system for estimating a range and a velocity of an object includes a processing device configured to perform, for each return pulse of a return signal including reflections of a radar signal, applying a first Fourier transform to the return pulse to transform the return pulse into a range spectrum and calculate a range intensity value for each of a plurality of range hypotheses, calculating a range variation for each of a plurality of hypothesized Doppler frequency values, and for each hypothesized Doppler frequency value, applying a second Fourier transform to the series of return pulses based on the range intensity values and the range variation. The processing device is further configured to perform outputting range and Doppler frequency data including a range-Doppler intensity value for each range hypothesis and hypothesized Doppler frequency, and estimating a range and a velocity of the object based on the range-Doppler intensity values.

16 Claims, 4 Drawing Sheets

OBJECT POSITION AND MOVEMENT ESTIMATION USING RADAR

The subject disclosure relates to estimation of object position and movement using radar.

Vehicles (e.g., automobiles, trucks, aircraft, construction equipment, farm equipment, automated factory equipment) are increasingly equipped with detection systems for monitoring surrounding environments. Radar systems may be used for detection and tracking of objects, for example, to avoid obstacles. Radar devices may be used in vehicles to alert a driver or user and/or to take evasive action. Detection and tracking systems are also useful in autonomously operated vehicles. The position of a moving object may not be detected accurately through conventional radar processing within typical integration times. Accordingly, it is desirable to provide a system for accurate position estimation of a moving object using radar.

SUMMARY

In one exemplary embodiment, a system for estimating a range and a velocity of an object includes a receiver configured to detect a return signal including reflections of a radar signal transmitted by a transmitter. The radar signal includes a series of transmitted pulses emitted over a time frame, the return signal includes a series of successive return pulses, and each return pulse corresponds to a transmitted pulse and is associated with a respective time interval in the time frame. The system also includes a processing device configured to perform, for each return pulse, applying a first Fourier transform to the return pulse to transform the return pulse into a range spectrum and to calculate a range intensity value for each of a plurality of range hypotheses associated with the respective time interval, calculating a range variation for each of a plurality of hypothesized Doppler frequency values, and for each hypothesized Doppler frequency value, applying a second Fourier transform to the series of return pulses based on the range intensity values and the range variation. The processing device is further configured to perform outputting range and Doppler frequency data including a range-Doppler intensity value for each range hypothesis and hypothesized Doppler frequency, and estimating a range and a velocity of the object based on the range-Doppler intensity values. Estimating the range and the velocity includes selecting one or more range-Doppler intensity values associated with a reflection from the object, each of the selected one or more range-Doppler intensity values corresponding to a range of the object and a Doppler frequency value associated with a velocity of the object.

In addition to one or more of the features described herein, the first Fourier transform and the second Fourier transform are applied by fast Fourier transform (FFT) algorithms.

In addition to one or more of the features described herein, applying the first Fourier transform includes generating a two-dimensional matrix including a plurality of matrix elements, the matrix having a first dimension defined by a plurality of time elements representing each time interval, and a second dimension defined by the plurality of range hypotheses, each matrix element having a range intensity value.

In addition to one or more of the features described herein, the second Fourier transform is performed on a series of range intensity values, the series of range intensity values selected from range hypotheses based on the range variation.

In addition to one or more of the features described herein, the range variation (R(t)) is calculated based on the following equation:

$$R(t) = \frac{cf_d t}{2f_c},$$

where $f_d$ is a hypothesized Doppler frequency, $f_c$ is a carrier frequency of the transmitted pulses, t is time and c is the speed of light.

In addition to one or more of the features described herein, each return pulse corresponds to a transmitted pulse time interval index (n), and applying the first Fourier transform includes calculating a vector of range intensity values at each time element, each intensity value in the vector corresponding to a respective range hypothesis.

In addition to one or more of the features described herein, wherein applying the second Fourier transform includes calculating the range-Doppler intensity value $y(r, f_d)$ as a function of range (r) and Doppler frequency ($f_d$) for each hypothesized Doppler frequency, wherein the calculating is performed based on the following equation:

$$y(r,f_d) = \sum_{n=0}^{N-1} x_n(r+R(nT_c))e^{-j2\pi n T_c f_d},$$

where $T_c$ is a time interval between transmitted pulses, n is the transmitted pulse time interval index, $x_n$ is a vector of range intensity values for an n-th transmitted pulse, N is a number of the time interval indexes, r is an initial range hypothesis, j is an imaginary unit, and $x_n(r+R(nT_c))$ is an element having an intensity value at a range defined by $(r+R(nT_c))$, wherein $R(nT_c)$ is the range variation calculated for the hypothesized Doppler frequency at the time interval index n.

In addition to one or more of the features described herein, the range and Doppler frequency data includes a two-dimensional range-Doppler frequency spectrum having an output value calculated via the second Fourier transform for each of a plurality of Doppler frequencies and ranges.

In addition to one or more of the features described herein, selecting the one or more range-Doppler intensity values includes comparing each output value to a selected threshold, and identifying the output value as a reflection from the object based on the output value being greater than or equal to the threshold.

In addition to one or more of the features described herein, the processing device is further configured to estimate a direction of the object by applying beamforming to the range-Doppler intensity values from multiple antennas to estimate an azimuth and elevation angle of the object.

In one exemplary embodiment, a method of estimating a range and a velocity of an object includes detecting a return signal including reflections of a radar signal transmitted by a transmitter. The radar signal includes a series of transmitted pulses emitted over a time frame, the return signal includes a series of successive return pulses, and each return pulse corresponds to a transmitted pulse and is associated with a respective time interval in the time frame. The method also includes, for each return pulse, applying a first Fourier transform to the return pulse to transform the return pulse into a range spectrum and to calculate a range intensity value for each of a plurality of range hypotheses associated with the respective time interval, calculating a range variation for each of a plurality of hypothesized Doppler frequency values, and for each hypothesized Doppler frequency value, applying a second Fourier transform to the series of return pulses based on the range intensity values and the range variation. The method further includes outputting range and Doppler frequency data including a range-Doppler intensity value for each range hypothesis and hypothesized Doppler frequency value, and estimating a range and a velocity of the object based on the range-Doppler intensity values. Estimating the range and the velocity includes selecting one or more range-Doppler intensity values associated with a reflection from the object. Each of the selected one or more range-Doppler intensity values corresponds to a range of the object and a Doppler frequency value associated with a velocity of the object.

In addition to one or more of the features described herein, the first Fourier transform and the second Fourier transform are applied by fast Fourier transform (FFT) algorithms.

In addition to one or more of the features described herein, applying the first Fourier transform includes generating a two-dimensional matrix including a plurality of matrix elements, the matrix having a first dimension defined by a plurality of time elements representing each time interval, and a second dimension defined by the plurality of range hypotheses, each matrix element having a range intensity value.

In addition to one or more of the features described herein, the second Fourier transform is performed on a series of range intensity values, the series of range intensity values selected from range hypotheses based on the range variation.

In addition to one or more of the features described herein, the range variation (R(t)) is calculated based on the following equation:

$$R(t) = \frac{cf_d t}{2f_c},$$

wherein $f_d$ is a hypothesized Doppler frequency, $f_c$ is a carrier frequency of the transmitted pulses, t is time and c is the speed of light.

In addition to one or more of the features described herein, each return pulse corresponds to a transmitted pulse time interval index (n), and applying the first Fourier transform includes calculating a vector of range intensity values at each time element, each intensity value in the vector corresponding to a respective range hypothesis.

In addition to one or more of the features described herein, applying the second Fourier transform includes calculating the range-Doppler intensity value $y(r, f_d)$ as a function of range (r) and Doppler frequency ($f_d$) for each hypothesized Doppler frequency, wherein the calculating is performed based on the following equation:

$$y(r,f_d) = \Sigma_{n=0}^{N-1} x_n(r+R(nT_c))e^{-j2\pi n T_c f_d},$$

wherein $T_c$ is a time interval between transmitted pulses, n is the transmitted pulse time interval index, $x_n$ is a vector of range intensity values for an n-th transmitted pulse, N is a number of the time interval indexes, r is an initial range hypothesis, j is an imaginary unit, and $x_n(r+R(nT_c))$ is an element having an intensity value at a range defined by $(r+R(nT_c))$, wherein $R(nT_c)$ is the range variation calculated for the hypothesized Doppler frequency at the time interval index n.

In addition to one or more of the features described herein, the range and Doppler frequency data includes a two-dimensional range-Doppler frequency spectrum having an output value calculated via the second Fourier transform for each of a plurality of Doppler frequencies and ranges.

In addition to one or more of the features described herein, selecting the one or more range-Doppler intensity values includes comparing each output value to a selected threshold, and identifying the output value as a reflection from the object based on the output value being greater than or equal to the threshold.

In addition to one or more of the features described herein, the processing device is further configured to estimate a direction of the object by applying beamforming to the range-Doppler intensity values from multiple antennas to estimate an azimuth and elevation angle of the object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
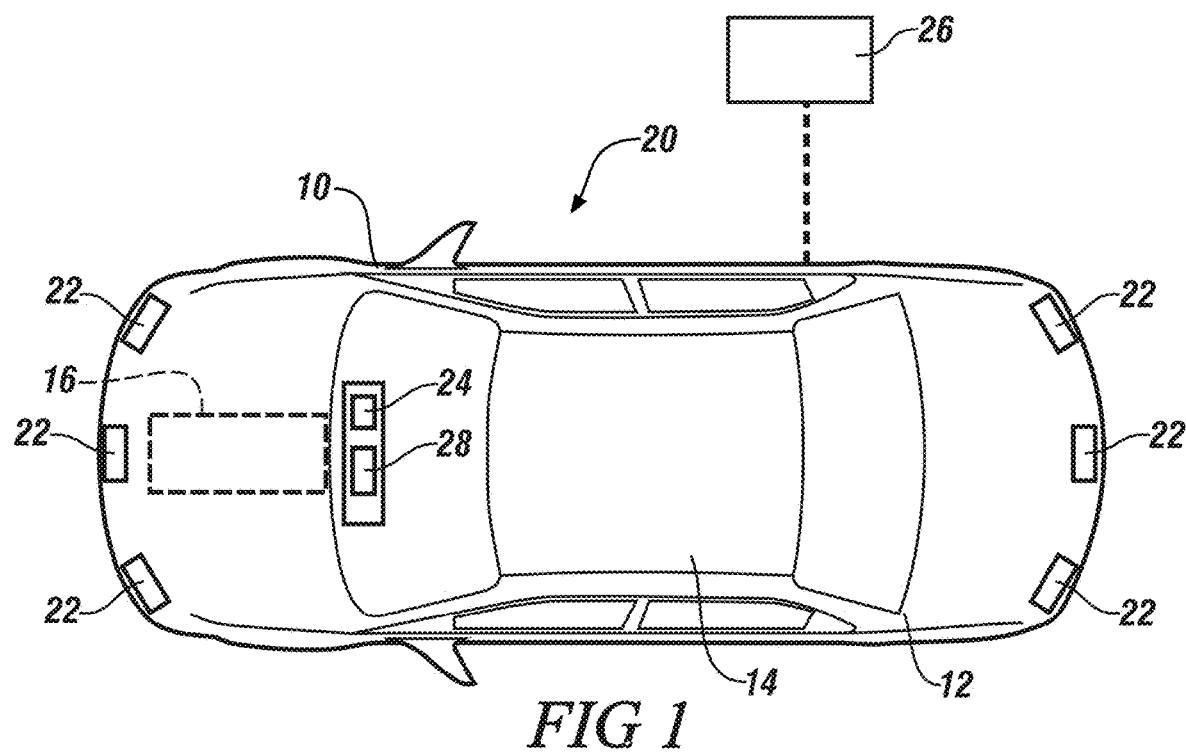
FIG. 1 is a top view of a motor vehicle including a radar system.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems for radar detection and position estimation are described herein. An embodiment of a radar system is configured to estimate a position and/or velocity of an object. An object may be any feature or condition that reflects transmitted radar signals. The radar system may be included in or connected to a vehicle for detection of objects such as road features, road obstructions, other vehicles, trees, people and others. The radar system is not limited to use with vehicles, and may be used in any context (e.g., weather, aviation and others).

The radar system is configured to transmit radar signals from one or more transmitters, each of which includes a series of successive pulses transmitted over a selected time frame. Reflections of the transmitted pulses are detected by a receiver and multiplied or mixed with a reference signal (e.g., a waveform corresponding to the transmitted radar signal) to generate a detection signal having a series of return pulses. Each return pulse is correlated with one of a plurality of successive time intervals within the time frame (referred to as "sub-frames"), and transformed into a frequency spectrum. For example, a first Fourier transform is applied to each return pulse to calculate intensity values at a corresponding time interval. Each intensity value (also referred to as a "range intensity value") corresponds to a pre-selected or hypothesized range (also referred to as a "range hypothesis"), and is indicative of the likelihood of a reflection at the hypothesized range. A "range" is a distance from a transmitter. A range hypothesis may be a single range value or a range interval bounded by upper and lower range values. A second Fourier transform is applied to each return pulse to estimate a frequency shift (referred to as a "Doppler frequency") associated with a velocity of the object.

In one embodiment, the radar system is configured to determine a variation between ranges corresponding to successive time intervals prior to transforming the return pulses according to the second Fourier transform. The range and Doppler frequency associated with a return pulse is then calculated using the second Fourier transform in combination with the range variation. In one embodiment, the range variation is determined as a function of Doppler frequency, by calculating a range variation for each of a plurality of hypothesized Doppler frequencies.

For example, individual return pulses are correlated with successive sub-frames, and each return pulse is input to an element of a matrix having dimensions defined by time interval and range. For example, a matrix referred to as a "range plot" includes rows having time elements corresponding to each time frame. Each time element is part of a column of range elements (also referred to as "range bins"), and each column includes a range element for each of a plurality of range values (range hypotheses).

In one embodiment, for each time element, the corresponding return pulse is scanned over the range bins by performing a first fast Fourier transform (FFT) process or algorithm. This process is referred to as "range FFT." Based on the range FFT, each return pulse is transformed to an intensity value (a "range intensity value") for each range bin.

Based on the range variation, a second Fourier transform is applied to the return pulses to output the range and velocity of the object over the time frame. In one embodiment, an output corresponding to object range and velocity is generated by applying a discrete Fourier transform (DFT) on range bins corresponding to the range variation (e.g., on range bins intersected by a range line).

Embodiments described herein have numerous advantages. For example, the radar system according to embodiments described herein can attain accurate range and Doppler estimation while adjusting for movement of an object during a selected integration time frame. Radar processes are performed according to periodic time frames which are selected based on considerations such as desired resolution signal-to-noise ratio (SNR). Longer time frames provide higher SNRs and higher Doppler resolutions. In order to efficiently implement Doppler signal processing, conventional systems assume that the range to an object is fixed within the selected time frame. This assumption can compromise the accuracy of radar processes if an object is moving at a high enough speed, as the reflected energy is spread over different ranges and Doppler frequencies. This spread can result in low detection probability and reduced accuracy. Embodiments described herein address the above challenges by accounting for variations in range over the time period, which allows for accurate position estimation over longer integration times, while maintaining a high radar resolution (e.g., 10 cm or less). The embodiments thus provide for the ability to adjust for movement of an object at high speeds in a longer time frame while maintaining a desired resolution, without requiring excessive processing resources. In addition, the embodiments increase accuracy by generating output peaks that are sharper than peaks generated by conventional processes.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10 includes aspects of a radar system 20 for detecting and tracking objects, which can be used to alert a user, perform avoidance maneuvers, assist the user and/or autonomously control the vehicle 10. The radar system 20 includes one or more radar sensing assemblies 22, each of which may include one or more transmit elements and/or one or more receive elements. The vehicle 10 may incorporate a plurality of radar sensing assemblies disposed at various locations and having various angular directions.

For example, each radar sensing assembly 22 includes a transmit portion and a receive portion. The transmit and receive portions may include separate transmit and receive antennas or share an antenna in a transceiver configuration. Each radar sensing assembly 22 may include additional components, such as a low pass filter (LPF) and/or a controller or other processing device.

The radar sensing assemblies 22 communicate with one or more processing devices, such as processing devices in each assembly and/or a remote processing device such as an on-board processor 24 and/or a remote processor 26. The remote processor 26 may be part of, for example, a mapping system or vehicle diagnostic system. The vehicle 10 may also include a user interaction system 28 and other components such as a GPS device.

The radar system 20 is configured generally to acquire radar signals and analyze the radar signals to estimate a position and/or a velocity of an object. The position and/or velocity are estimated by integrating acquired signal pulses over a selected time frame. The length of the time frame is selected to provide for a desired resolution. As discussed further below, the radar system 20 analyzes the radar signals over the time frame while adjusting the signals to account for motion of the object over the time frame.

Figure 2:
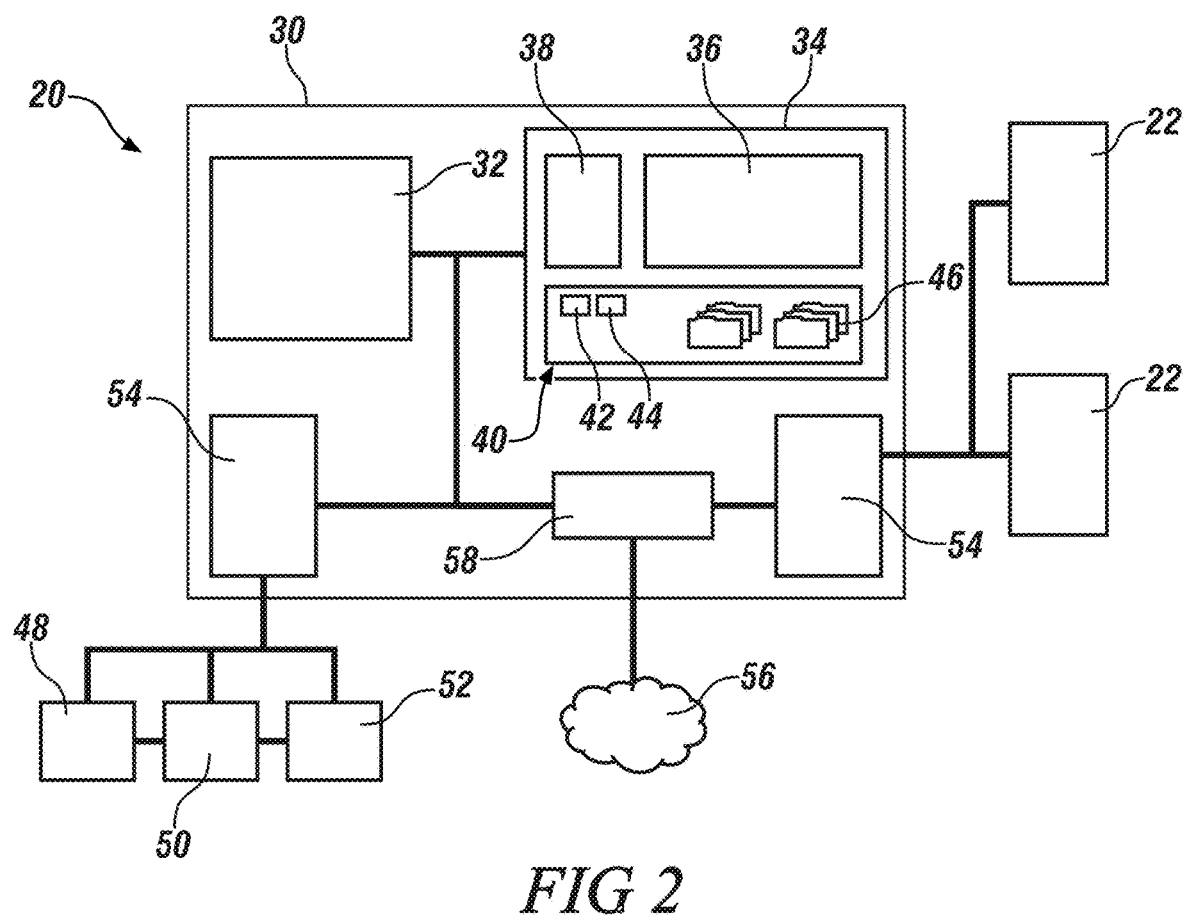
FIG. 2 depicts a radar system, in accordance with an exemplary embodiment.

FIG. 2 illustrates aspects of an embodiment of a computer system 30 that is in communication with or is part of the radar system 20, and that can perform various aspects of embodiments described herein. The computer system 30 includes at least one processing device 32, which generally includes one or more processors for performing aspects of radar detection and analysis methods described herein. The processing device 32 can be integrated into the vehicle 10, for example, as the on-board processor 24, or can be a processing device separate from the vehicle 10, such as a server, a personal computer or a mobile device (e.g., a smartphone or tablet). For example, the processing device 32 can be part of, or in communication with, one or more engine control units (ECU), one or more vehicle control modules, a cloud computing device, a vehicle satellite communication system and/or others. The processing device 32 may be configured to perform radar detection and analysis methods described herein, and may also perform functions related to control of various vehicle subsystems.

Components of the computer system 30 include the processing device 32 (such as one or more processors or processing units) and a system memory 34. The system memory 34 may include a variety of computer system readable media. Such media can be any available media that is accessible by the processing device 32, and includes both volatile and non-volatile media, removable and non-removable media.

For example, the system memory 34 includes a non-volatile memory 36 such as a hard drive, and may also include a volatile memory 38, such as random access memory (RAM) and/or cache memory. The computer system 30 can further include other removable/non-removable, volatile/non-volatile computer system storage media.

The system memory 34 can include at least one program product having a set (e.g., at least one) of program modules that are configured to carry out functions of the embodiments described herein. For example, the system memory 34 stores various program modules 40 that generally carry out the functions and/or methodologies of embodiments described herein. For example, a receiver module 42 may be included to perform functions related to acquiring and processing received signals, and an analysis module 44 may be included to perform functions related to position estimation and range finding. The system memory 34 may also store various data structures 46, such as data files or other structures that store data related to radar detection and analysis. Examples of such data include sampled return signals, frequency data, range-Doppler plots, range maps, and object position, velocity and/or azimuth data. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 can also communicate with one or more external devices 48 such as a keyboard, a pointing device, and/or any devices (e.g., network card, modem, etc.) that enable the processing device 32 to communicate with one or more other computing devices. In addition, the processing device 32 can communicate with one or more devices that may be used in conjunction with the radar system 20, such as a Global Positioning System (GPS) device 50 and a camera 52. The GPS device 50 and the camera 52 can be used, for example, in combination with the radar system 20 for autonomous control of the vehicle 10. Communication with various devices can occur via Input/Output (I/O) interfaces 54.

The processing device 32 may also communicate with one or more networks 56 such as a local area network (LAN), a general wide area network (WAN), and/or a public network (e.g., the Internet) via a network adapter 58. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

Figure 3:
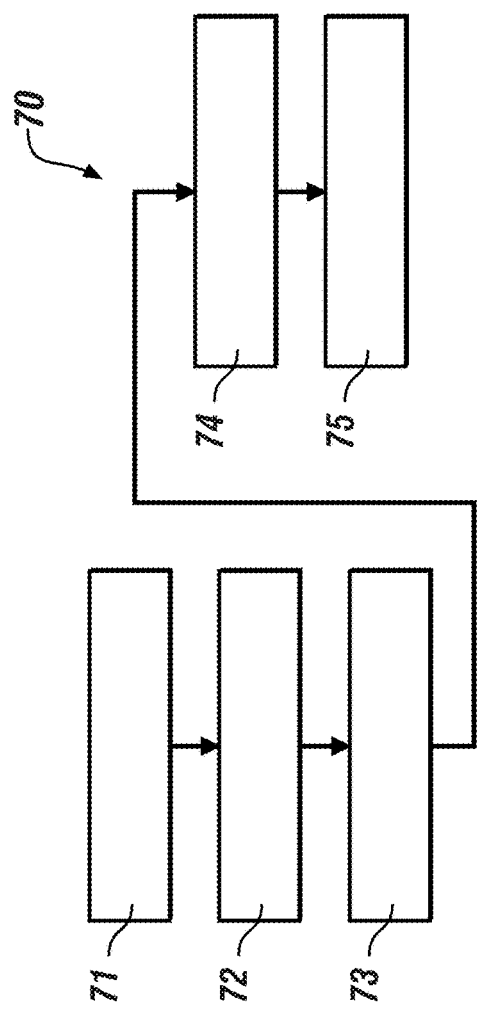
FIG. 3 is a flowchart depicting a method of estimating an object position, direction and/or velocity using a radar system, in accordance with an exemplary embodiment.

FIG. 3 illustrates aspects of an embodiment of a computer-implemented method 70 of radar detection and analysis, which includes estimating an object location or position, direction and/or velocity. The method 70 may be performed by a processor or processors disposed in a vehicle (e.g., processing device 32, as an ECU or on-board computer) and/or disposed in a device such as a smartphone, tablet or smartwatch. The method 70 is discussed in conjunction with the radar system 20 of FIG. 1 and components shown in FIG. 2 for illustration purposes. It is noted that aspects of the method 70 may be performed by any suitable processing device or system.

The method 70 includes a plurality of stages or steps represented by blocks 71-75, all of which can be performed sequentially. However, in some embodiments, one or more of the stages can be performed in a different order than that shown or fewer than the stages shown may be performed.

At block 71, a radar signal is transmitted by one or more transmit elements in a radar system such as the radar system 20. Each transmit element transmits radar signals having a series of pulses. As described herein, "pulses" refer to a series of repeating waveforms, which are not limited to those described herein. In one embodiment, the transmit element transmits a linear frequency-modulated continuous wave (LFM-CW) signal. This signal may be referred to as a "chirp signal," and each pulse may be referred to as a "chirp."

Figure 4:
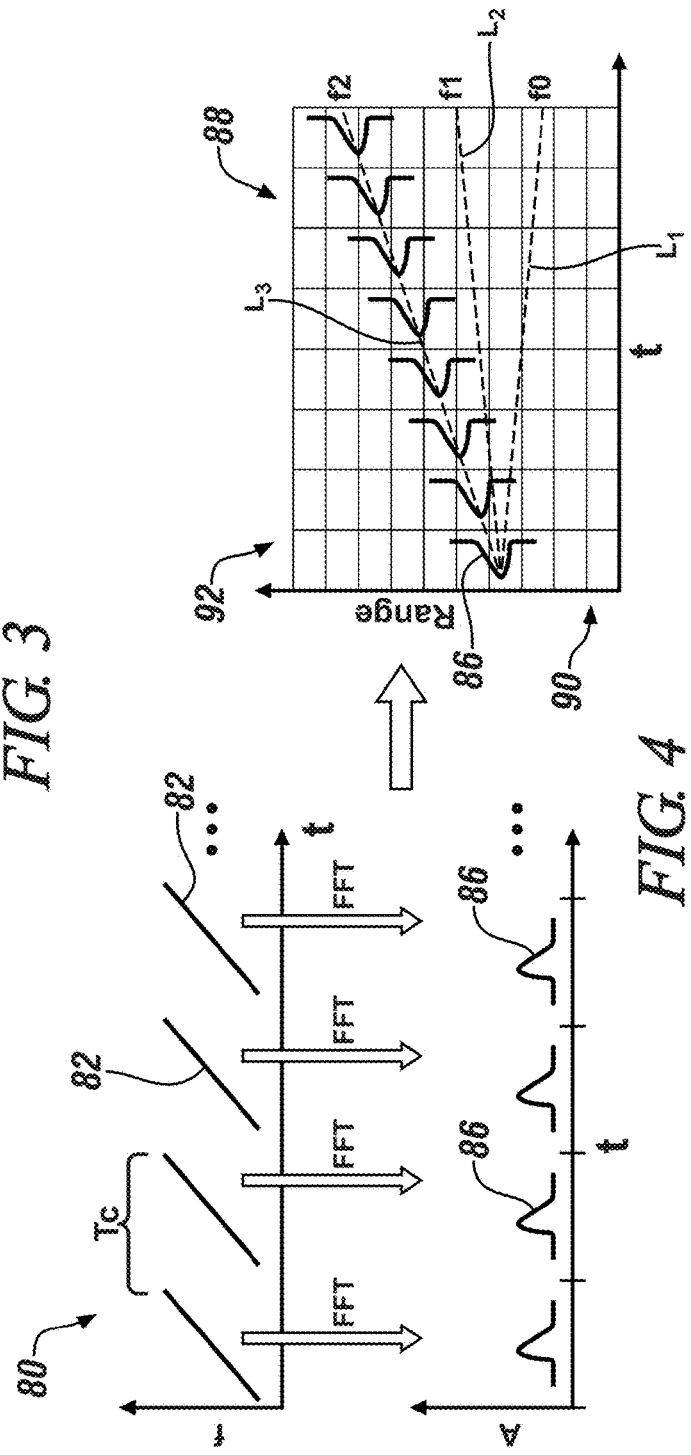
FIG. 4 depicts examples of a transmitted radar signal, frequency domain transforms of a return signal and estimation of an object position and Doppler frequency information associated with an object.

An example of a chirp signal 80 is shown in FIG. 4, which includes a series of chirps 82. As shown, each chirp 82 has a frequency f that increases linearly within a sub-frame. Each sub-frame has a duration $T_c$, which is equal to the time between adjacent chirps 82.

Although only one chirp signal 80 is discussed herein, it is to be understood that the method 70 is applicable to multiple radar signals and/or chirp signals, from a single transmit element or multiple transmit elements. For example, the method 70 may be performed for multiple chirp signals 80 emitted by the same transmit element, for multiple transmit elements having the same location and orientation, and/or from multiple chirp signals 80 from transmit elements having different locations and/or orientations.

Characteristics of the chirp signal 80 may be selected, for example, to distinguish signals from different transmit elements. Examples of characteristics include bandwidth (BW), chirp slope (rate of increase or decrease of frequency) and chirp time (temporal length of each chirp). Other characteristics may be selected, such as field of view and detection threshold (minimum detectable amplitude).

Returning to FIG. 3, at block 72, a return signal is detected or measured by one or more receive elements as a measurement signal. For example, analog signals detected by the receive elements are sampled and converted to digital signals, referred to herein as detection signals. In one embodiment, the detection signals are multiplied by or mixed with a reference signal to generate a return signal. For example, a detection signal including reflections of the transmitted chirps 82 is mixed with a reference signal such as the waveform of the chirp signal 80. The resulting return signal includes a series of return pulses, which may be correlated with the chirps 82.

At block 73, a processing device, such as the processor 32, transforms each return pulse into the frequency domain by using a Fourier transform. In one embodiment, the processing device 32 uses a fast Fourier transform (FFT) algorithm (also referred to as "range FFT") to generate range spectra associated with each return pulse. The range FFT is a one-dimensional FFT configured to transform the return pulses into range intensity values that can be used to estimate the range (referred to as the "range domain") of a reflection.

Referring again to the example of FIG. 4, the processing device 32 performs a range FFT process, which includes performing Discrete Fourier transforms on the samples making up each return pulse to generate range spectra 86.

Examples of range spectra 86 are shown correlated in time with their respective chirps 82.

Each range spectrum 86 is scanned over a series of range bins, each of which is a filter configured to detect an intensity of a range spectrum 86 at frequencies $f_r$ associated with a given hypothesized range value. The range value may be a single value or multiple values. For example, a range spread of about 30 meters is selected and divided into successive range bins representing 10 cm intervals. A range spectrum 86 may be assigned to a range bin based on the range spectrum 86 having a spike (an amplitude exceeding some threshold) that corresponds to a frequency ($f_r$) in the range bin. For example, a range intensity value is calculated for a range of a given range bin, and the range intensity value assigned to the range bin is zero if the intensity of the range spectrum 86 at the range bin is zero or below a threshold intensity.

In one embodiment, each range spectrum 86 is stored in a matrix 88 that forms rows 90 having a number N of time elements n. Each time element has a width equal to the temporal length of a sub-frame of the time frame. For each time element n in the row 90, the matrix 88 includes a column 92 of successive range bins.

Each range bin in the columns 92 is associated with a range value r, which indicates a distance from the transmit element to an object. The range r can be expressed, for example, as range bin numbers, actual range values, frequency values or any other suitable index.

The range FFT process outputs, for each time element n (which can be represented by a transmitted pulse time interval index n or a chirp index n), a vector $x_n$ with complex elements. Each complex element in the vector $x_n$ corresponds to a frequency $f_r$ associated with a given range bin.

As an illustration, the matrix 88 shows eight range spectra 86, which are input to corresponding time elements n in the row 90 (N=8). Each range spectrum 86 is given an integer, so that the first spectrum is n=0, the second adjacent spectrum is n=1, and so on.

Each return pulse is transformed and scanned along a corresponding column 92. One or more peaks are identified for each range spectrum 86, and each range spectrum 86 is assigned to a range bin. In the example of FIG. 4, each range spectrum 86 includes one peak representing reflections from one object. However, the range spectra 86 may have multiple peaks representing multiple objects. If a range spectrum 86 has multiple peaks, it may be each assigned to multiple range bins.

At block 74 of FIG. 3, the processing device 32 calculates a range variation R(t) between at least two adjacent range spectra 86 as a function of time t. In one embodiment, the range variation is calculated for one or more hypothesized Doppler frequencies $f_d$. The Doppler frequency $f_d$ can be expressed as:

$$f_d = \frac{2f_c}{c} v_r, \quad (1)$$

where $f_c$ is the carrier frequency (source frequency) of a transmitted pulse, c is the speed of light, and $v_r$ is the radial velocity of a moving object (i.e. the projection of the velocity vector to the direction pointing from the object to the radar sensing assembly 22). The velocity $v_r$ can thus be expressed as:

$$v_r = \frac{cf_d}{2f_c}. \quad (2)$$

The range variation R(t) as a function of time is then:

$$R(t) = v_r(t) = \frac{cf_d t}{2f_c}. \quad (3)$$

In one embodiment, the range variation over the return pulses is calculated for each of a plurality of hypothesized Doppler frequencies $f_d$. For example, for a given $f_d$, R(t) is calculated between adjacent range bins in which a return pulse has been assigned. The Doppler frequencies may be individual frequency values or frequency ranges.

FIG. 4 shows the result of an example of a range variation calculation performed according to embodiments described herein. In the example of FIG. 4, for a first hypothesized Doppler frequency $f_0$, the range variation R(t) between successive time elements n is calculated according to equation (3), and corresponds to a linear function range represented by a line $L_1$. The range variation is similarly calculated for a second hypothesized Doppler frequency $f_1$, and corresponds to a linear function range represented by a line $L_2$. The range variation calculated for a third hypothesized Doppler frequency $f_2$ corresponds to a linear function range represented by a line $L_3$. As can be seen in FIG. 4, the range variations corresponding to lines $L_1$ and $L_2$ intersect mostly empty cells (having an intensity value of zero or a value below a threshold) in the matrix 88.

In some cases, a range value resulting from the range variation calculations falls in between range bins or are within some proximity to an adjacent range bin. In some cases, the value of R(t) at that range bin can be rounded up or down (i.e., moved to the next bin above or below), or adjusted in any other suitable manner, such as by linear interpolation.

At block 75 of FIG. 3, the range and velocity of the object is determined by applying a second Fourier transform to estimate the frequency shift (Doppler frequency) and estimate object position and velocity. The second Fourier transform is selected to calculate frequencies associated with object range and velocity and thereby transform the return pulses into the range-Doppler frequency domain. In one embodiment, the processing device 32 uses a fast Fourier transform (FFT) algorithm to generate frequency spectra associated with each return pulse, which can be used to estimate a position and velocity value associated with each frequency spectrum. This FFT is a one-dimensional FFT referred to as a "Doppler FFT."

The processing device 32 calculates the range and Doppler frequency for an object at a time associated with a sub-frame by performing the Doppler FFT while accounting for range variations R(t) estimated at block 74.

In one embodiment, each return pulse is analyzed and transformed using a Doppler FFT algorithm that outputs range and Doppler frequency data. For example, an output of the Doppler FFT includes an output value as function of Doppler frequency and range variation. The output may be considered a range-Doppler spectrum including intensity values as a function of range and Doppler frequency.

An example of a Fourier transform function that can be applied is represented by the following formula or equation:

$$y(r, f_d) = \sum_{n=0}^{N-1} x_n(r + R(nT_c)) e^{-j2\pi n T_c f_d}, \quad (4)$$

In the above equation, N is a number of the time elements n, and n is a transmitted pulse time interval index having a temporal length equal to a time interval $T_c$ between pulses, r is an initial range hypothesis (e.g., corresponding to the lowest range bin), and j is an imaginary unit.

$x_n$ is a vector of range intensity values at a time interval index n (the n-th transmitted pulse and corresponding return pulse). The element $x_n(r+R(nT_c))$ is the intensity value at a time element n in a range bin $r+R(nT_c)$, where $R(nT_c)$ is the range variation calculated for the hypothesized Doppler frequency at the time element n (or transmitted pulse time interval index n).

The output of the above equation is a complex value $y(r, f_d)$ (which may have arbitrary units) based on a summation of the intensity values in the range bins for each of a plurality of pre-selected Doppler frequency values or hypothesized Doppler frequencies $f_d$. $x_n$ is the output vector (in arbitrary units) of the range FFT for the n-th return pulse.

In the example of FIG. 4, each column 92 is the range FFT for a different return pulse or chirp (before applying the transformation to the range-Doppler spectrum), and the rows represent different successive return pulses or chirps.

For each hypothesized Doppler frequency $f_d$ value, the range variation R(t) is calculated and can be represented as a diagonal line that indicates the range bins along which a pulse is scanned. For each hypothesized Doppler frequency $f_d$, samples are taken from frequency data stored in or associated with a range bin intersected by the calculated diagonal. The summation and phase rotation performed in equation (4) is performed along the diagonal. For example, in the first time element (n=0), the range is equal to the range r associated with the first range bin. The summation proceeds to the next time element (n=1) and the range is r+R, where R is calculated for the time interval $T_c$*n (which is equal to $T_c$ at bin number 1).

Based on the Doppler FFT, the processing device 32 outputs range and Doppler frequency data indicative of the range and velocity of an object. For example, the processing device 32 outputs range and Doppler frequency data that includes a range-Doppler intensity value for each range hypothesis, such as for range interval or range bin (or at least a subset of the range hypotheses), for a hypothesized Doppler frequency. The output can include range-Doppler intensity values for one or more hypothesized Doppler frequencies. For example, the range and Doppler frequency data for each hypothesized Doppler frequency is compared to an intensity threshold to identify one or more selected hypothesized Doppler frequencies associated with reflections from an object.

In the example of FIG. 4, calculation of $y(f_0)$ along the diagonal $L_1$ results in an output of zero or close to zero, as the range bins along this diagonal are empty ($x_n$=0). Calculation along the diagonal $L_2$ results in a similar output.

Calculation of $y(f_2)$ along the diagonal $L_3$, which is populated with samples of the return pulses, results in one or more signal spikes at Doppler frequency $f_2$. Based on this calculation, the velocity is estimated to correspond with the Doppler frequency $f_2$ and the output provides the estimated range over the time frame.

Additional processes may be performed as part of the method 70 or in addition to the method 70. For example, further processing is performed to estimate the direction of the object. In one embodiment, azimuth filtering is performed, for example, applying azimuth beamforming over multiple antennas per a range and Doppler bin to show the output as a function of azimuth.

FIGS. 5-8 illustrate an example of range and Doppler calculations and outputs performed according to embodiments described herein, in comparison with an example of calculations performed by a conventional process.

Figure 5:
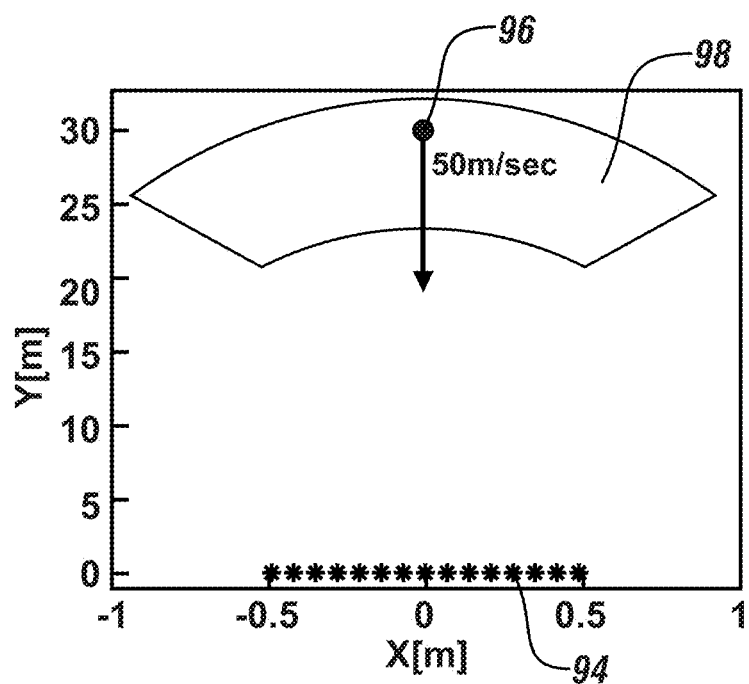
FIG. 5 depicts an example of a radar detection scenario.

In this example, radar pulses 94 are emitted toward a moving object 96. Region 98 shows an observation window during a time frame selected for a radar signal. A sufficiently high radar range resolution is selected, for example, as about 10 cm or less. Such a range resolution is desirable in contexts such as autonomous vehicle operation, to allow sufficient time to react to a detected object. The time frame in this example is selected to be about 50 milliseconds. Also in this example, as shown in FIG. 5, the object 96 is moving toward a radar transmitter at a relative velocity of about 50 m/s.

Figure 6:
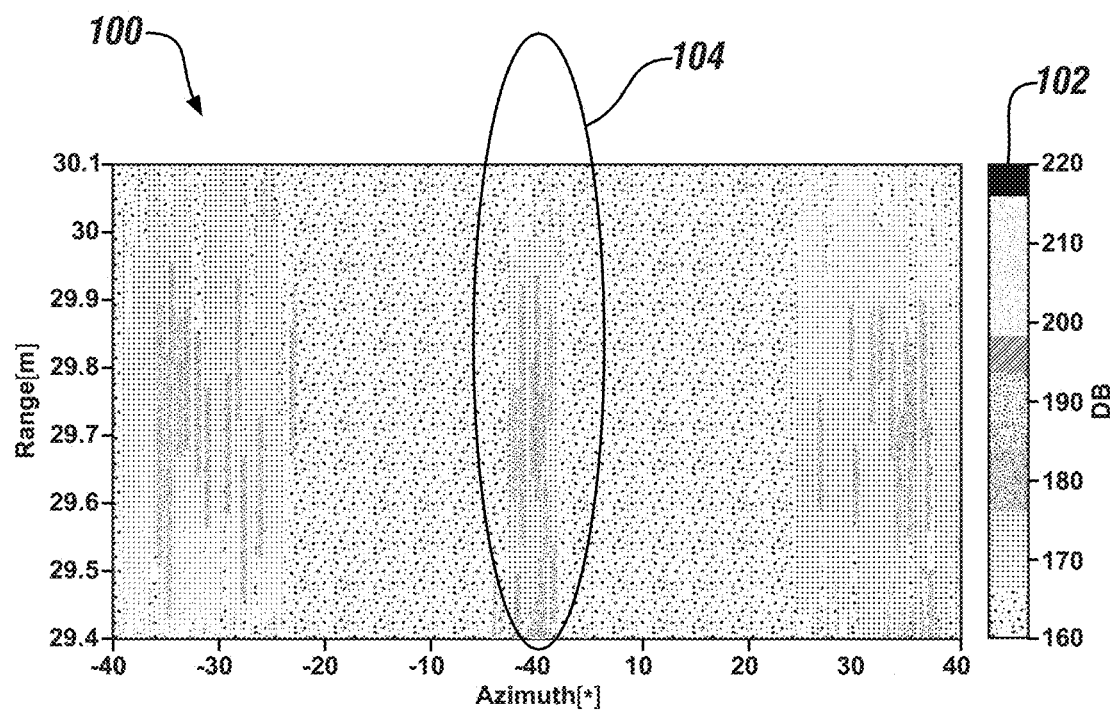
FIG. 6 depicts an example of a range map generated according to a conventional radar detection method.

FIG. 6 shows the result of a conventional radar detection method, in which the object range is assumed to be constant during the time frame. The result is in the form of a range map 100 that is color coded according to the legend 102, showing an output of the detection method as a function of range and azimuth. As shown in region 104, there is a large range spread at azimuth of zero degrees.

Figure 7:
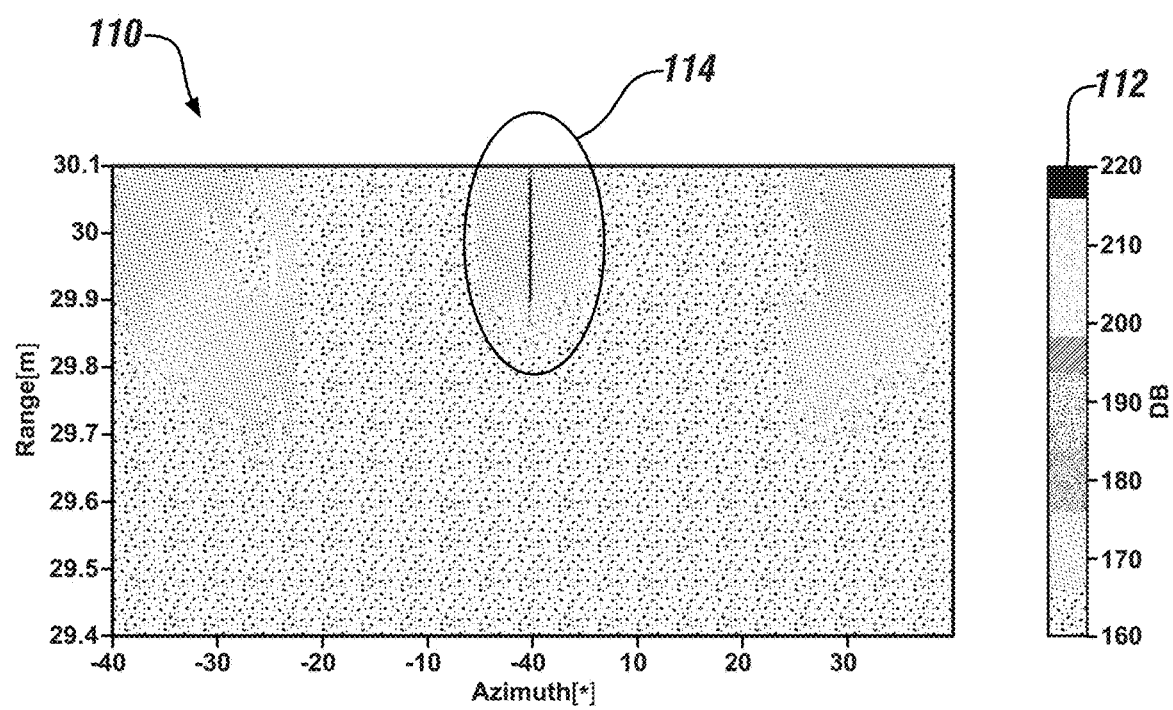
FIG. 7 depicts an example of a range map generated according to the method of FIG. 3.

FIG. 7 illustrates a range map 110 that is color coded according to the legend 112. As shown in region 114, the process performed according to embodiments described herein produces a significantly smaller range spread and thus significantly better accuracy at high range resolutions and longer integration times.

Figure 8:
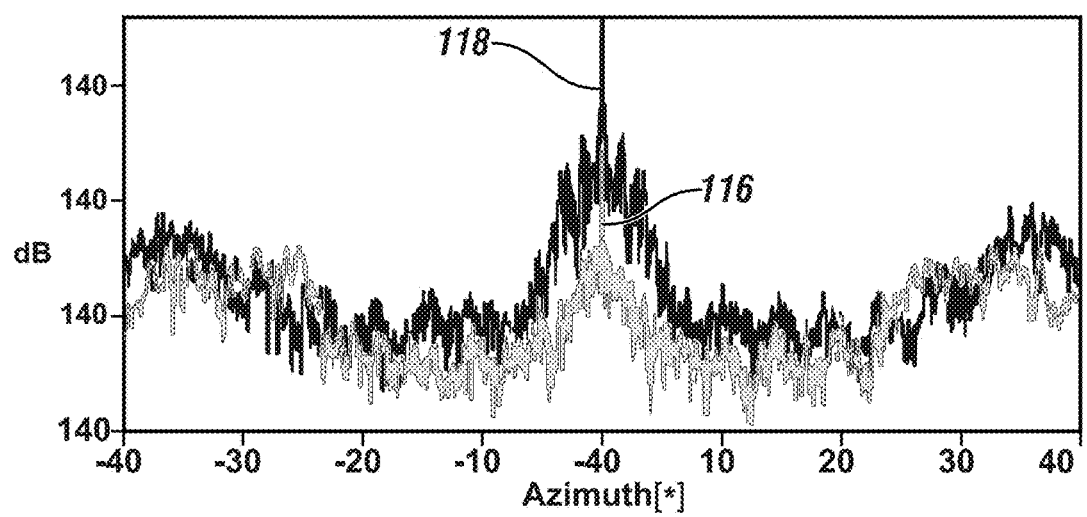
FIG. 8 depicts an example of azimuth signals associated with the range map of FIGS. 6 and 7.

In addition, as noted above, the embodiments described herein produce higher intensity and sharper signal peaks. For example, FIG. 8 shows an azimuth cut 116 of the range map 100 from the conventional process, and an azimuth cut 118 of the range map 110. As shown, the methods described herein produce significantly stronger peaks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for estimating a range and a velocity of an object, the system comprising:
a receiver configured to detect a return signal including reflections of a radar signal transmitted by a transmitter, the radar signal including a series of transmitted pulses emitted over a time frame, the return signal including a series of successive return pulses, each return pulse corresponding to a transmitted pulse and associated with a respective time interval in the time frame; and
a processing device configured to perform:
for each return pulse, applying a first Fourier transform to the return pulse to transform the return pulse into a range spectrum and calculate a range intensity value for each of a plurality of range hypotheses associated with the respective time interval;
generating a two-dimensional matrix based on the calculated range intensity values, the matrix having a first dimension having a plurality of time elements representing each time interval, and a second dimension having a plurality of range bins, wherein a return pulse associated with a given time element includes range intensity values corresponding to multiple range bins;

calculating a range variation for each of a plurality of hypothesized Doppler frequency values, the range variation calculated between range intensity values associated with at least two adjacent range bins;

for each hypothesized Doppler frequency value, selecting a set of range bins, the set of range bins corresponding to at least one range bin selected from each of the time intervals based on the range variation, and applying a second Fourier transform to the range intensity values associated with each range bin of the set of range bins;

outputting range and Doppler frequency data including a range-Doppler intensity value for each range hypothesis and hypothesized Doppler frequency; and estimating a range and a velocity of the object based on the range-Doppler intensity values, wherein estimating the range and the velocity includes selecting one or more range-Doppler intensity values associated with a reflection from the object, each of the selected one or more range-Doppler intensity values corresponding to a range of the object and a Doppler frequency value associated with a velocity of the object.

2. The system of claim 1, wherein the first Fourier transform and the second Fourier transform are applied by fast Fourier transform (FFT) algorithms.

3. The system of claim 1, wherein the range variation (R(t)) is calculated based on the following equation:

$$R(t) = \frac{c f_d t}{2 f_c},$$

wherein $f_d$ is a hypothesized Doppler frequency, $f_c$ is a carrier frequency of the transmitted pulses, t is time and c is the speed of light.

4. The system of claim 3, wherein each return pulse corresponds to a transmitted pulse time interval index (n), and applying the first Fourier transform includes calculating a vector of range intensity values at each time element, each intensity value in the vector corresponding to a respective range hypothesis.

5. The system of claim 4, wherein applying the second Fourier transform includes calculating the range-Doppler intensity value $y(r, f_d)$ as a function of range (r) and Doppler frequency ($f_d$) for each hypothesized Doppler frequency, wherein the calculating is performed based on the following equation:

$$y(r, f_d) = \Sigma_{n=0}^{N-1} x_n(r + R(n T_c)) e^{-j 2 \pi n T_c f_d}$$

wherein $T_c$ is a time interval between transmitted pulses, n is the transmitted pulse time interval index, $x_n$ is a vector of range intensity values for an n-th transmitted pulse, N is a number of the time interval indexes, r is an initial range hypothesis, j is an imaginary unit, and $x_n(r + R(n T_c))$ is an element having an intensity value at a range defined by $(r + R(n T_c))$, wherein $R(n T_c)$ is the range variation calculated for the hypothesized Doppler frequency at the time interval index n.

6. The system of claim 1, wherein the range and Doppler frequency data includes a two-dimensional range-Doppler frequency spectrum having an output value calculated via the second Fourier transform for each of a plurality of Doppler frequencies and ranges.

7. The system of claim 6, wherein selecting the one or more range-Doppler intensity values includes comparing each output value to a selected threshold, and identifying the output value as a reflection from the object based on the output value being greater than or equal to the threshold.

8. The system of claim 1, wherein the processing device is further configured to estimate a direction of the object by applying beamforming to the range-Doppler intensity values from multiple antennas to estimate an azimuth and elevation angle of the object.

9. A method of estimating a range and a velocity of an object, the method comprising:

detecting a return signal including reflections of a radar signal transmitted by a transmitter, the radar signal including a series of transmitted pulses emitted over a time frame, the return signal including a series of successive return pulses, each return pulse corresponding to a transmitted pulse and associated with a respective time interval in the time frame;

for each return pulse, applying a first Fourier transform to the return pulse to transform the return pulse into a range spectrum and calculate a range intensity value for each of a plurality of range hypotheses associated with the respective time interval;

generating a two-dimensional matrix based on the calculated range intensity values, the matrix having a first dimension having a plurality of time elements representing each time interval, and a second dimension having a plurality of range bins, wherein a return pulse associated with a given time element includes range intensity values corresponding to multiple range bins;

calculating a range variation for each of a plurality of hypothesized Doppler frequency values, the range variation calculated between range intensity values associated with at least two adjacent range bins;

for each hypothesized Doppler frequency value, selecting a set of range bins, the set of range bins corresponding to at least one range bin selected from each of the time intervals based on the range variation, and applying a second Fourier transform to the range intensity values associated with each range bin of the set of range bins;

outputting range and Doppler frequency data including a range-Doppler intensity value for each range hypothesis and hypothesized Doppler frequency value; and estimating a range and a velocity of the object based on the range-Doppler intensity values, wherein estimating the range and the velocity includes selecting one or more range-Doppler intensity values associated with a reflection from the object, each of the selected one or more range-Doppler intensity values corresponding to a range of the object and a Doppler frequency value associated with a velocity of the object.

10. The method of claim 9, wherein the first Fourier transform and the second Fourier transform are applied by fast Fourier transform (FFT) algorithms.

11. The method of claim 9, wherein the range variation (R(t)) is calculated based on the following equation:

$$R(t) = \frac{c f_d t}{2 f_c},$$

wherein $f_d$ is a hypothesized Doppler frequency, $f_c$ is a carrier frequency of the transmitted pulses, t is time and c is the speed of light.

12. The method of claim 11, wherein each return pulse corresponds to a transmitted pulse time interval index (n), and applying the first Fourier transform includes calculating a vector of range intensity values at each time element, each intensity value in the vector corresponding to a respective range hypothesis.

13. The method of claim 12, wherein applying the second Fourier transform includes calculating the range-Doppler intensity value $y(r,f_d)$ as a function of range (r) and Doppler frequency ($f_d$) for each hypothesized Doppler frequency, wherein the calculating is performed based on the following equation:

$$y(r,f_d) = \Sigma_{n=0}^{N-1} x_n(r+R(nT_c))e^{-j2\pi nT_c f_d}$$

wherein $T_c$ is a time interval between transmitted pulses, n is the transmitted pulse time interval index, $x_n$ is a vector of range intensity values for an n-th transmitted pulse, N is a number of the time interval indexes, r is an initial range hypothesis, j is an imaginary unit, and $x_n(r+R(nT_c))$ is an element having an intensity value at a range defined by $(r+R(nT_c))$, wherein $R(nT_c)$ is the range variation calculated for the hypothesized Doppler frequency at the time interval index n.

14. The method of claim 9, wherein the range and Doppler frequency data includes a two-dimensional range-Doppler frequency spectrum having an output value calculated via the second Fourier transform for each of a plurality of Doppler frequencies and ranges.

15. The method of claim 14, wherein selecting the one or more range-Doppler intensity values includes comparing each output value to a selected threshold, and identifying the output value as a reflection from the object based on the output value being greater than or equal to the threshold.

16. The method of claim 9, wherein the processing device is further configured to estimate a direction of the object by applying beamforming to the range-Doppler intensity values from multiple antennas to estimate an azimuth and elevation angle of the object.

\* \* \* \* \*